May 3, 1932.  G. A. CHADBOURNE  1,856,984
SICKLE BAR CONTROL
Filed Nov. 17, 1930
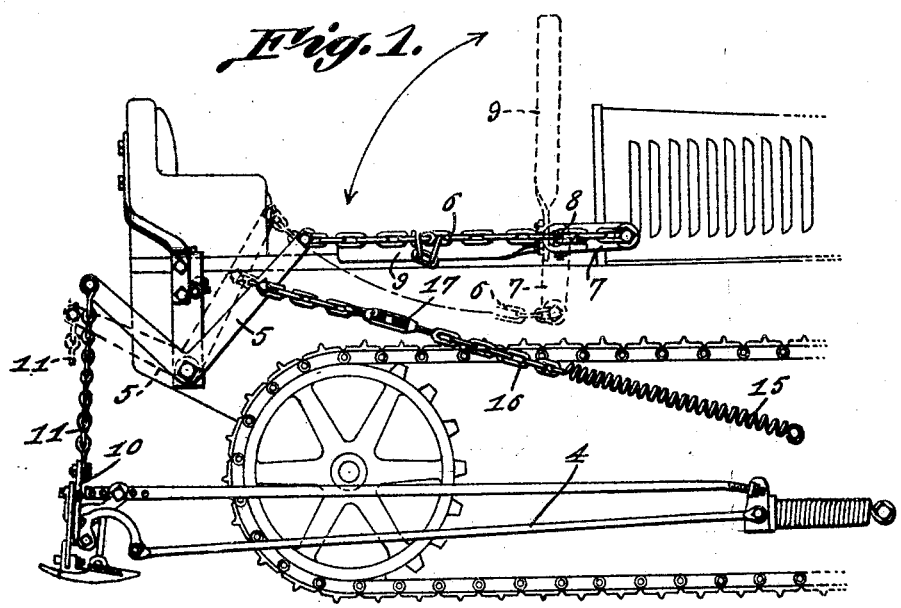
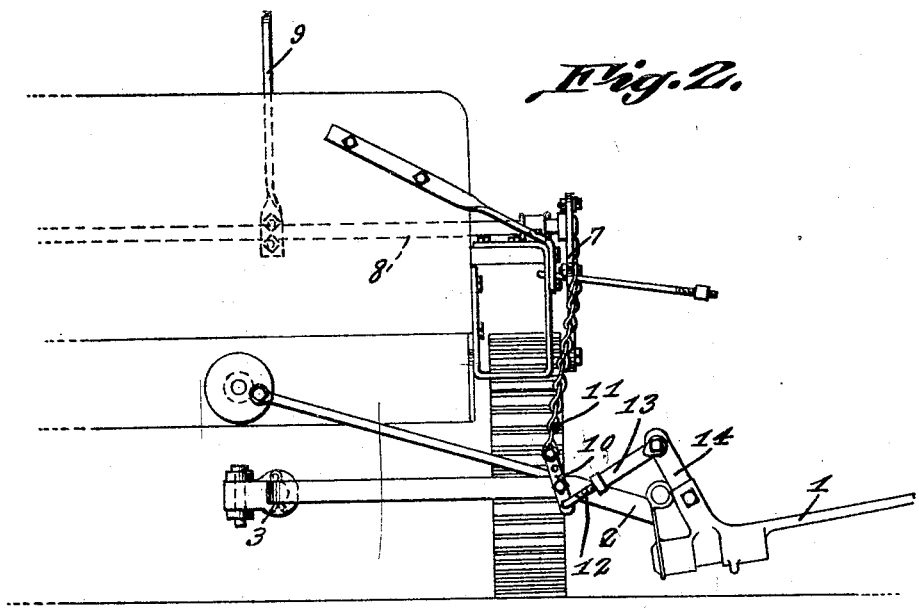
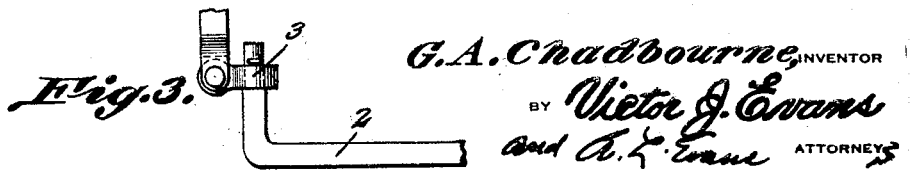

Patented May 3, 1932

1,856,984

UNITED STATES PATENT OFFICE

GLENN A. CHADBOURNE, OF CHADBORN, MONTANA

SICKLE BAR CONTROL

Application filed November 17, 1930. Serial No. 496,259.

This invention relates to controlling means for the sickle bar of a tractor mower, the general object of the invention being to provide means whereby the operator can adjust the bar with the minimum amount of effort and also to provide counterbalancing means for the sickle bar and its associated parts, which are adjustable so that the bar can automatically ride over obstacles without damage to the knives and permits the sickle bar to accommodate itself to a higher or lower mowing elevation when the tractor is passing over uneven ground.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a fragmentary elevation of a tractor mower, showing the invention in use.

Figure 2 is a rear view.

Figure 3 is a detail plan view.

In these drawings, the sickle bar assembly is shown at 1 and the bar to which the assembly is pivoted is shown at 2. This bar 2 is pivotally supported from the rear of the tractor, as shown at 3, so that the assembly can swing in a vertical plane. The assembly is connected with the tractor by the usual means which are shown generally at 4.

In carrying out the invention, I provide a bell crank 5 which is pivotally supported from the tractor and has one end connected by an adjustable chain 6 to an arm 7 on a shaft 8 to which is attached a hand lever 9. A small lever 10 is pivoted to the bar 2 and a chain 11 connects the upper end of this lever with the rear end of the bell crank 5.

A hook 12 has its shank threaded in a socket in a link 13 which is pivoted to the upper end of a projection 14 extending upwardly from the inner end of the sickle bar assembly and the hook engages a hole in the lever 10.

A spring 15 has one end connected with a part of the tractor and its other end is connected by a chain 16 to the bell crank 5, the chain containing a turnbuckle 17 which permits the tension of the spring to be adjusted.

From the foregoing it will be seen that when the hand lever 9 is in lowered or horizontal position, as shown in full lines in Figure 1, the sickle bar assembly will be held in raised position so that the machine can be turned or moved from place to place with the sickle bar assembly in inoperative position or whenever it is desired to move the sickle bar to inoperative position, such for instance as in clearing obstacles. During the mowing operation, the lever 9 is moved to a vertical position, as shown in dotted lines in Figure 1, so that the sickle bar will be in mowing position.

The spring 15 acts as a counterbalance for the sickle bar assembly and can be adjusted to properly balance the assembly. The turnbuckle 17 provides means for adjusting the tension of the spring 15 for properly counterbalancing the inner end or shoe of the sickle bar and by adjusting the hook 12 in the socket of link 13, the outer end of the sickle bar can be properly counterbalanced.

The counterbalancing action of the spring on the sickle bar will permit the bar to readily pass over obstacles without danger of damaging the knives and permits the sickle bar to accommodate itself to a higher or lower mowing elevation when the tractor is traveling over uneven ground.

The invention is most simple and not likely to get out of order and is easy to operate and there are but two simple adjustments to fit various conditions of mowing. The invention also enables mowing operations in fields that are uneven and as before stated, permits the sickle bar to ride over obstructions without danger of injuring the knives.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. In a tractor mower including the sickle bar assembly and its supporting means, a bell crank supported from the tractor, a shaft journaled on the tractor, a lever for rocking the shaft, a flexible member adjustable as to its length connecting the bell crank to a part on the shaft, a lever pivoted to the supporting means of the sickle bar assembly, a flexible member connecting the bell crank with the upper end of the lever and a connection adjustable as to its length for connecting the lower end of the lever with an upwardly extending part on the assembly.

2. In a tractor mower including the sickle bar assembly and its supporting means, a bell crank supported from the tractor, a shaft journaled on the tractor, a lever for rocking the shaft, a flexible member adjustable as to its length connecting the bell crank to a part on the shaft, a lever pivoted to the supporting means of the sickle bar assembly, a flexible member connecting the bell crank with the upper end of the lever, a connection adjustable as to its length for connecting the lower end of the lever with an upwardly extending part on the assembly, a spring connected with a part of the tractor, a flexible member connecting the spring with the bell crank and means for adjusting the tension of the spring.

In testimony whereof I affix my signature.

GLENN A. CHADBOURNE.